United States Patent
Greenberg

(10) Patent No.: US 7,508,449 B1
(45) Date of Patent: Mar. 24, 2009

(54) FILM MODE JUDDER ELIMINATION CIRCUIT AND METHOD

(75) Inventor: Robert Y. Greenberg, Portland, OR (US)

(73) Assignee: Pixelworks, Inc., Tualatin, OR (US)

( * ) Notice: Subject to any disclaimer, the term of this patent is extended or adjusted under 35 U.S.C. 154(b) by 600 days.

(21) Appl. No.: 11/177,882

(22) Filed: Jul. 8, 2005

(51) Int. Cl.
*H04N 7/01* (2006.01)
*H04N 11/20* (2006.01)

(52) U.S. Cl. .................. 348/459; 348/447; 348/449

(58) Field of Classification Search .............. 348/447, 348/459, 458, 441, 497, 558, 555, 556, 97, 348/98, 448, 449
See application file for complete search history.

(56) References Cited

U.S. PATENT DOCUMENTS

| 6,469,744 B1 | 10/2002 | Pearlstein |
| 6,963,377 B2 * | 11/2005 | Del Corso ................ 348/558 |
| 2004/0239803 A1 * | 12/2004 | Selby et al. ............... 348/459 |
| 2005/0134735 A1 * | 6/2005 | Swartz ....................... 348/554 |

\* cited by examiner

*Primary Examiner*—M. Lee
(74) *Attorney, Agent, or Firm*—Marger, Johnson & McCollom, P.C.

(57) ABSTRACT

We describe and claim a film mode judder elimination circuit and method. A film mode detector detects a film mode in a video signal. A judder eliminator eliminates judder by dynamically transitioning from one field rate, e.g., 60 Hz, to another field rate, e.g., 48 Hz or 72 Hz, responsive to the detection. The transition between the one and another field rate may occur during the vertical blanking period to avoid flicker.

20 Claims, 4 Drawing Sheets

FILM MODE JUDDER ELIMINATION CIRCUIT AND METHOD

FIELD

This application relates to a film mode judder elimination circuit and method.

BACKGROUND

Film mode judder or flicker is an unwanted video effect caused when two fields that combine to make the frame are not identically matched, thus creating two different time-alternating pictures. A process termed telecine or 3:2 pulldown may introduce film mode judder when it converts film shot at 24 Hz (or frames per second) to an interlaced 60 Hz video signal.

The inverse process, aptly named inverse-telecine or inverse 3:2 pulldown, converts the interlaced video signal to a progressive scan video signal when a progressive scan television or other device identifies the interlaced signal as having originated as film. This later process is often termed film mode detection. If the television cannot identify the interlaced video signal's origin as film, other processes including motion adaptive deinterlacing (MAD) convert the interlaced video signal to a progressive scan signal.

The inverse-telecine process does not completely remove or eliminate the judder introduced during the telecine process.

Accordingly, a need remains for a film mode judder elimination circuit and method.

BRIEF DRAWINGS DESCRIPTION

We describe embodiments referencing the following drawings.

DETAILED DESCRIPTION

Figure 1:
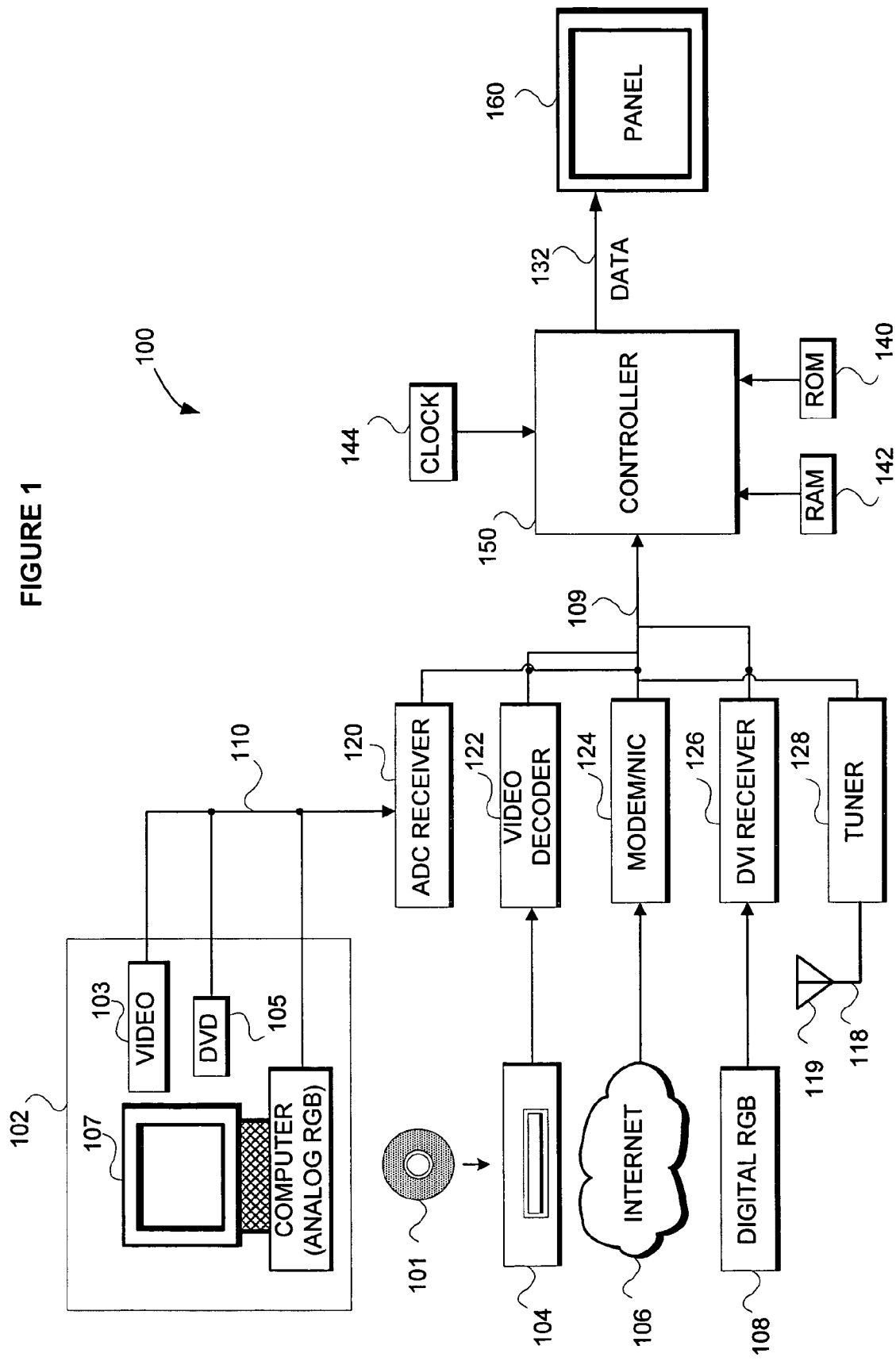
FIG. 1 is a block diagram of an embodiment of a display system including a film mode judder elimination circuit.

FIG. 1 is a block diagram of a display system 100. Referring to FIG. 1, the system 100 includes a receiver 120 for receiving an analog image data signal 110, e.g., RGB or $YP_BP_R$ signal, from a source 102. The source 102 may be a personal computer 107, a digital video disk player 105, set top box (STB) 103, or any other device capable of generating the analog image data signal 110. The receiver 120 may be an analog-to-digital converter (ADC) or any other device capable of generating digital video signal 109 from the analog image data 110. The receiver 120 converts the analog image data signal 110 into the digital image data 109 and provides it to a controller 150. A person of reasonable skill in the art knows well the design and operation of the source 102 and the receiver 120.

Likewise, a video receiver or decoder 122 decodes an analog video signal 112 from a video source 104. The video source 104 may be a video camcorder, tape player, digital video disk (DVD) player, or any other device capable of generating the analog video signal 112. The video source 104 may read (or play) external media 101. In an embodiment, a DVD player 104 plays the DVD 101. In another embodiment, a VHS tape player 104 plays a VHS tape 101. The decoder 122 converts the analog video signal 112 into the digital video signal 109 and provides it to the display controller 150. The decoder is any device capable of generating digital video signal 109, e.g., in Y/C or CVBS format, from the analog video signal 112. A person of reasonable skill in the art knows well the design and operation of the video source 104 and the video decoder 112.

A modem or network interface card (NIC) 124 receives data 114 from a global computer network 106 such as the Internet®. The data 114 may be in any format capable of transmission over the network 106. In an embodiment, the data 114 is packetized digital data. But the data 114 may also be in an analog form. Likewise, the modem 124 may be a digital or analog modem or any device capable of receiving and/or decoding data 114 from a network 106. The modem 124 provides digital video signal 109 to the display controller 150. A person of reasonable skill in the art knows well the design and operation of the network 106 and the modem/NIC 124.

A Digital Visual Interface (DVI) or high definition multimedia interface (HDMI) receiver 126 receives digital signals 116 from a digital source 108. In an embodiment, the source 108 provides digital RGB signals 116 to the receiver 126. The receiver 126 provides digital video signal 109 to the display controller 150. A person of reasonable skill in the art knows well the design and operation of the source 108 and the receiver 126.

A tuner 128 receives a wireless signal 118 transmitted by the antenna 119. The antenna 119 is any device capable of wirelessly transmitting or broadcasting the signal 118 to the tuner 128. In an embodiment, the antenna 119 transmits a television signal 118 to the television tuner 128. The tuner 128 may be any device capable of receiving a signal 118 transmitted wirelessly by any other device, e.g., the antenna 119, and of generating the digital video signal 109 from the wireless signal 118. The tuner 128 provides the digital video signal 109 to the controller 150. A person of reasonable skill in the art knows well the design and operation of the antenna 119 and the tuner 128.

The controller 150 may generate image data and/or control signals 132 (collectively data signal 132) by manipulating the digital video signal 109 or any other signal it receives at its input. The display controller 150 provides the image data 132 to a panel 160 in any of a variety of manners. In an embodiment, the panel 160 is a television either analog (e.g., Cathode Ray Tube (CRT)), digital (e.g., High Definition Television (HDTV)), or otherwise. The panel 160 may be digital with a fixed pixel structure, e.g., active and passive LCD displays, plasma displays (PDP), field emissive displays (FED), electro-luminescent (EL) displays, micro-mirror technology displays, low temperature polysilicon (LTPS) displays, and the like. The panel 160 may be other than a digital display, e.g., an analog display such as a CRT as used in monitors, projectors, personal digital assistants, and other like applications.

In an embodiment, the controller 150 may scale the digital video signal 109 for display using a variety of techniques including pixel replication, spatial and temporal interpolation, digital signal filtering and processing, and the like. In another embodiment, the controller 150 may additionally change the resolution of the digital video signal 109, changing the frame rate and/or pixel rate encoded in the digital video signal 109. We will not discuss scaling, resolution, frame and/or pixel rate conversion, and/or color manipulation in any further detail. A person of reasonable skill in the art should recognize that the controller 150 may manipulate the video signal 109 and provides the image data 132 to the panel 160 such that it is capable of properly displaying a high quality image regardless of display type.

Read-only (ROM) and random access (RAM) memories 140 and 142, respectively, are coupled to the display system controller 150 and store bitmaps, FIR filter coefficients, and the like. A person of reasonable skill in the art should recognize that the ROM and RAM memories 140 and 142, respectively, may be of any type or size depending on the application, cost, and other system constraints. A person of reasonable skill in the art should recognize that the ROM and RAM memories 140 and 142, respectively, are optional in the system 100. A person of reasonable skill in the art should recognize that the ROM and RAM memories 140 and 142, respectively, may be external or internal to the controller 150. RAM memory 142 may be a flash type memory device. Clock 144 controls timing associated with various operations of the controller 150.

The digital video signal 109 may be in a variety of formats, including composite or component video. Composite video describes a signal in which luminance, chrominance, and synchronization information are multiplexed in the frequency, time, and amplitude domain for single wire transmission. Component video, on the other hand, describes a system in which a color picture is represented by a number of video signals, each of which carries a component of the total video information. In a component video device, the component video signals may be processed separately and, ideally, encoding into a composite video signal occurs only once, prior to transmission. The digital video signal 109 may be a stream of digital numbers describing a continuous analog video waveform in either composite or component form. FIG. 1 describes a variety of devices (and manners) in which the digital video signal 109 may be generated from an analog video signal or other sources. A person of reasonable skill in the art should recognize other devices for generating the video signal 109 come within the scope of the application.

In FIG. 1, the controller 150 is shown as receiving the digital video signal 109.

Alternatively, the controller 150 may receive an analog signal, e.g., analog image data signal 110 from the video 103, DVD 105, and/or computer 107. In the later case, the controller 150 may include means for receiving and converting the analog signal into the digital signal 109, e.g., ADC receiver 120 or video decoder 122.

Figure 2:
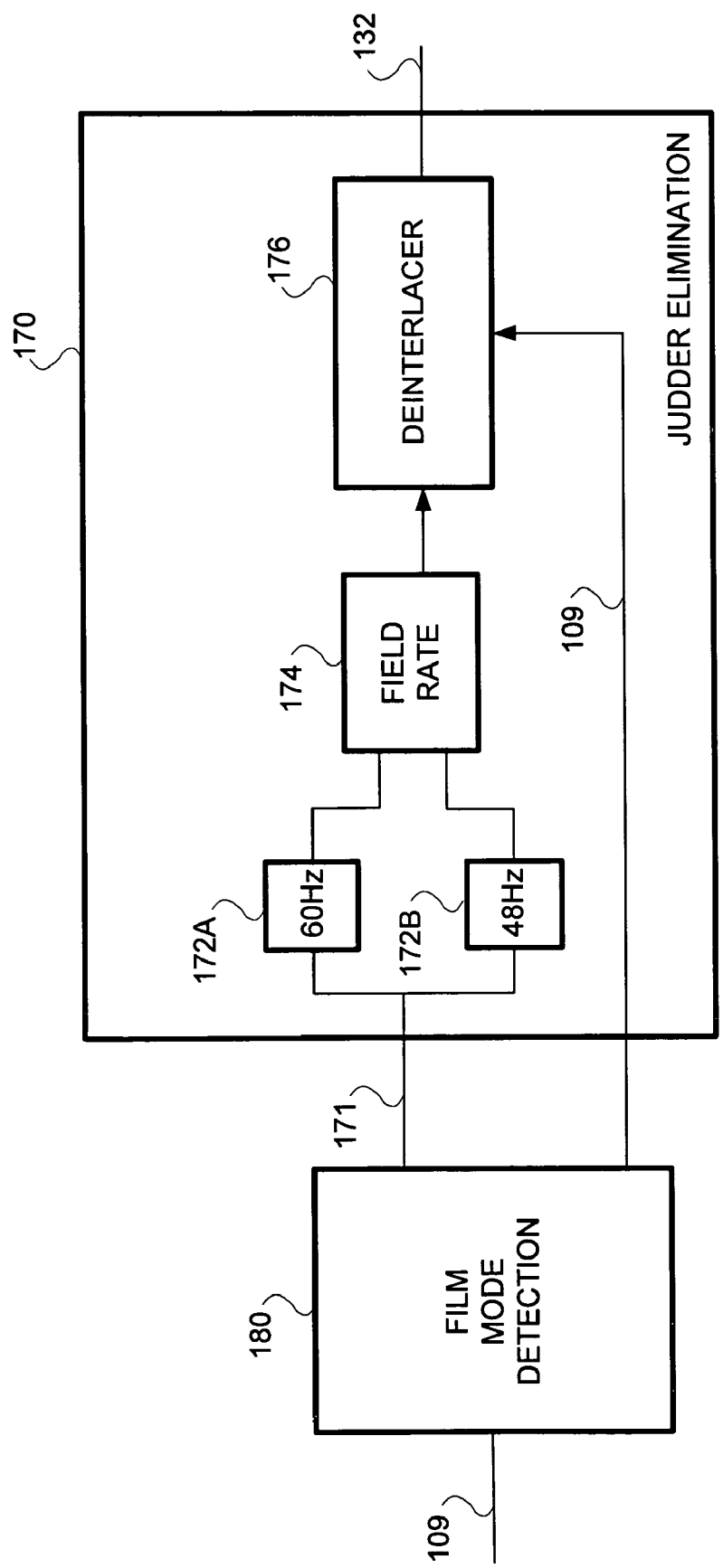
FIG. 2 is a block diagram of an embodiment of a film mode judder elimination circuit.

FIG. 2 is a block diagram of circuitry included in an embodiment of the controller 150. Referring to FIGS. 1 and 2, the controller 150 may receive an interlaced video signal 109 that may have originated from a film source. The interlaced video signal 109 may have a field (or frame or vertical refresh rate) different from the field or frame rate of the film. For example, the interlaced video signal 109 may have a 60 Hz field rate while the film may have a 24 Hz field rate.

Film mode judder or flicker is an unwanted video effect caused when two fields that combine to make the frame are not identically matched, thus creating two different time-alternating pictures, as we described above. Telecine or 3:2 pulldown may introduce film mode judder when it creates time errors during the conversion from film to interlaced video signal 109.

When the panel 160 is progressive scan as in many digital televisions, the deinterlacer 176 may convert (or deinterlace) the interlaced video signal 109 to a progressive scan signal 132 using an inverse-telecine or inverse 3:2 pulldown process. The judder elimination circuit 170 may operate responsive to a mode signal 171.

A film mode detection circuit 180 generates the mode signal 171 when it detects whether the video signal 109 originated from film. The film mode detection circuit 180 may detect a film mode in any of a variety of well known manners, e.g., 2:2 pulldown, 3:2 pulldown, and others. In an embodiment, the film mode detection circuit 180 detects film mode by identifying a predetermined recurring frame pattern where 3 frames are from a first field followed by 2 frames from a second field, and so on$_{[ryg1]}$. An example of film mode detection circuit 180 is provided in co-pending U.S. patent application Ser. No. 10/393,654 titled Weighted Absolute Difference Based Deinterlace Method And Apparatus, to Zhongde Wang and Dennis Morel, filed Mar. 20, 2003 (claiming priority to Oct. 11, 2001), and commonly assigned to Pixelworks. We incorporate the '654 application here by reference. Other means of detecting film mode are well known to those of skill in the art and come within the scope of the claims.

If the film mode detection circuit 180 determines the interlaced signal 109 not to have originated from film, the deinterlacer 176 may convert the interlaced video signal 109 to the progressive scan signal 132 using deinterlacing techniques such as Motion Adaptive Deinterlacing (MAD). MAD and other deinterlacing techniques are well known to those of reasonable skill in the art. We will not discuss MAD or other deinterlacing techniques in any further detail.

If, on the other hand, the film mode detection circuit 180 determines the interlaced signal 109 as having originated from film, the deinterlacer 176 may convert the interlaced video signal 109 to the progressive scan signal 132 using inverse telecine or reverse 3:2 pulldown. The deinterlacer 176 frame locks to a multiple of the film's field rate 174. In an embodiment, the field rate 174 is twice the film's field rate, or 48 Hz (2×24 Hz). In another embodiment, the field rate 174 is thrice the film's field rate, or 72 Hz (3×24 Hz). The field rate 174 may be other multiples of the film's field rate.

The judder elimination circuit 170 may dynamically change the output field rate 174$_{[ryg2]}$ as the video signal 109 changes from film mode to video mode. That is, the film mode detection circuit 180 detects portions of the video signal 109 originating from film (film mode) and portions of the video signal 109 that did not originate from film (video mode) indicated by the mode signal 171. The film mode detection circuit 180 dynamically sets the field rate 174 responsive to the detection as indicated by the mode signal 171. In an embodiment, the judder elimination circuit 170 accomplishes a seamless transition from frame locking to an integer of the film's field rate (e.g., 48 or 72 Hz) in film mode to frame locking to interlaced signal 109's rate (e.g., 60 Hz) by making the transition from one field rate to another during a vertical blanking interval. Doing so avoids screen flicker on the panel 160.

The judder elimination circuit 170 may include a register 172A to indicate a horizontal period for video mode and a register 172B to indicate a horizontal period for film mode. For example, the register 172A may indicate a video mode horizontal period of 60 Hz while the register 172B may indicate a film mode horizontal period of e.g., either 48 or 72 Hz.

The judder elimination circuit 170 may be capable of frame locking to fractional ratios during film mode. For example, the judder elimination circuit 170 may be able to output 4 vertical synchronization signals for every 5 vertical synchronization signals in the video signal 109 responsive to a field rate 174 of 48 Hz. For another example, the judder elimination circuit may be able to output 6 vertical synchronization signals for every 5 vertical synchronization signals in the video signal 109 responsive to a field rate of 72 Hz$_{[ryg3]}$.

When not in film mode, the frame locking ratio is 1:1 to produce a 60 Hz progressive output.

Figure 3:
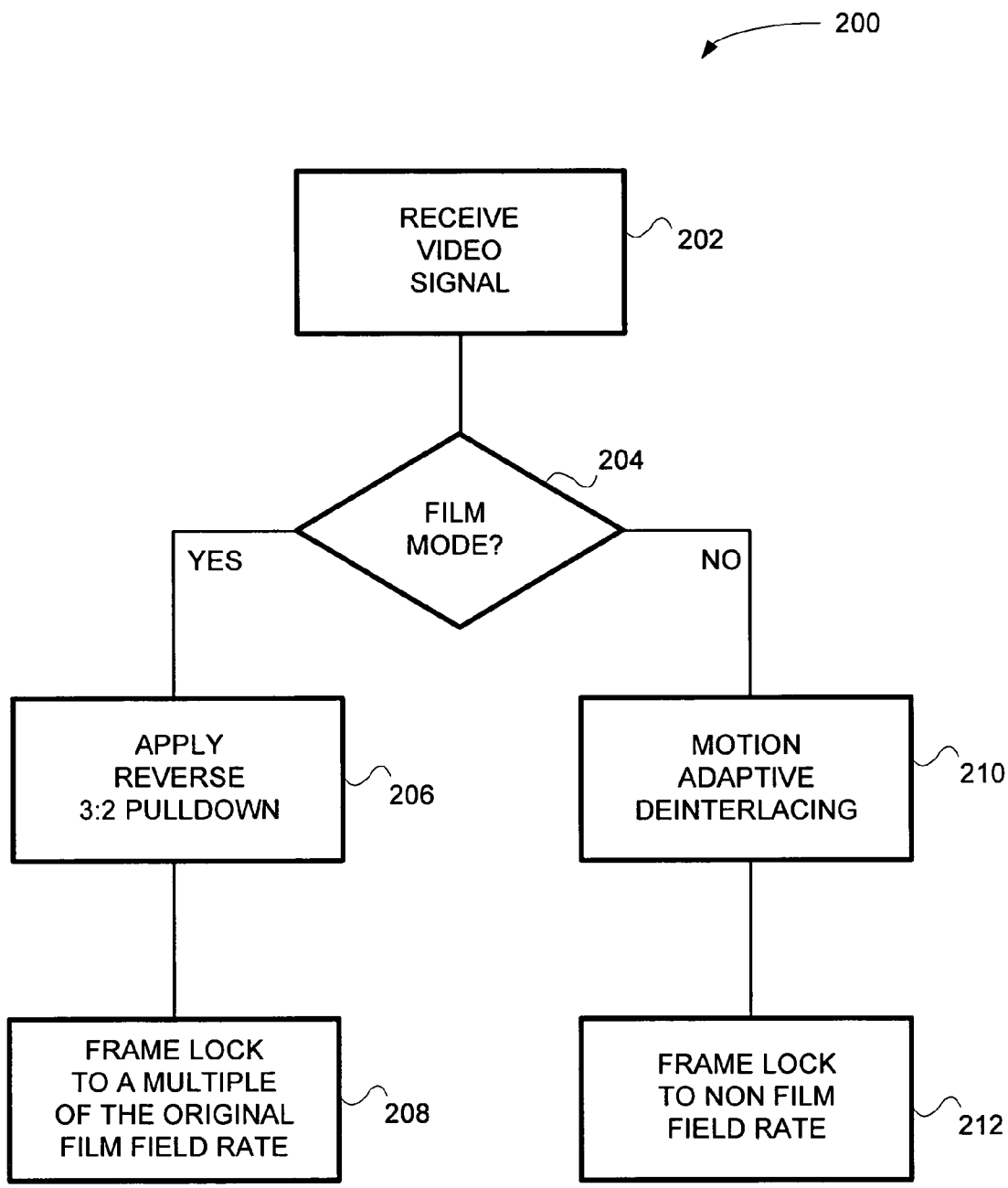
FIG. 3 is a flowchart of an embodiment of a film mode judder elimination method.

FIG. 3 is a flowchart of an embodiment of a film mode judder elimination method 200. At processing block 202, the judder elimination method 200 receives an interlaced video signal to be displayed on a progressive scan panel. At block 204, the method 200 determines if the interlaced video signal originated from film.

If the interlaced video signal did not originate from film, the method 200 deinterlaces the signal using any number of techniques including MAD (block 210) and locks to the interlaced video signal's field rate, e.g., 60 Hz (block 212).

If, on the other hand, the interlaced video signal does originate from film, the method 200 deinterlaces the signal using reverse telecine or reverse 3:2 pulldown (block 206) and locks to a multiple of the original film's field rate (block 206). In an embodiment, the method 200 frame locks to twice the film's field rate or 48 Hz ($2\times24$ Hz$_{[\mathit{r\!y\!g\!4}]}$). Since only a 60 Hz field rate is given, the method 200 may derive a 48 Hz field rate as follows.

60 Hz$\times\frac{4}{5}$=48 Hz.

In another embodiment, the method 200 frame locks to thrice the film's field rate or 72 Hz ($3\times24$ Hz$_{[\mathit{r\!y\!g\!5}]}$). Since only a 60 Hz field is given, the method 200 may derive a 72 Hz field rate as follows.

60 Hz$\times\frac{6}{5}$=72 Hz

The field rate 174 may be other multiples of the film's field rate.

Figure 4:
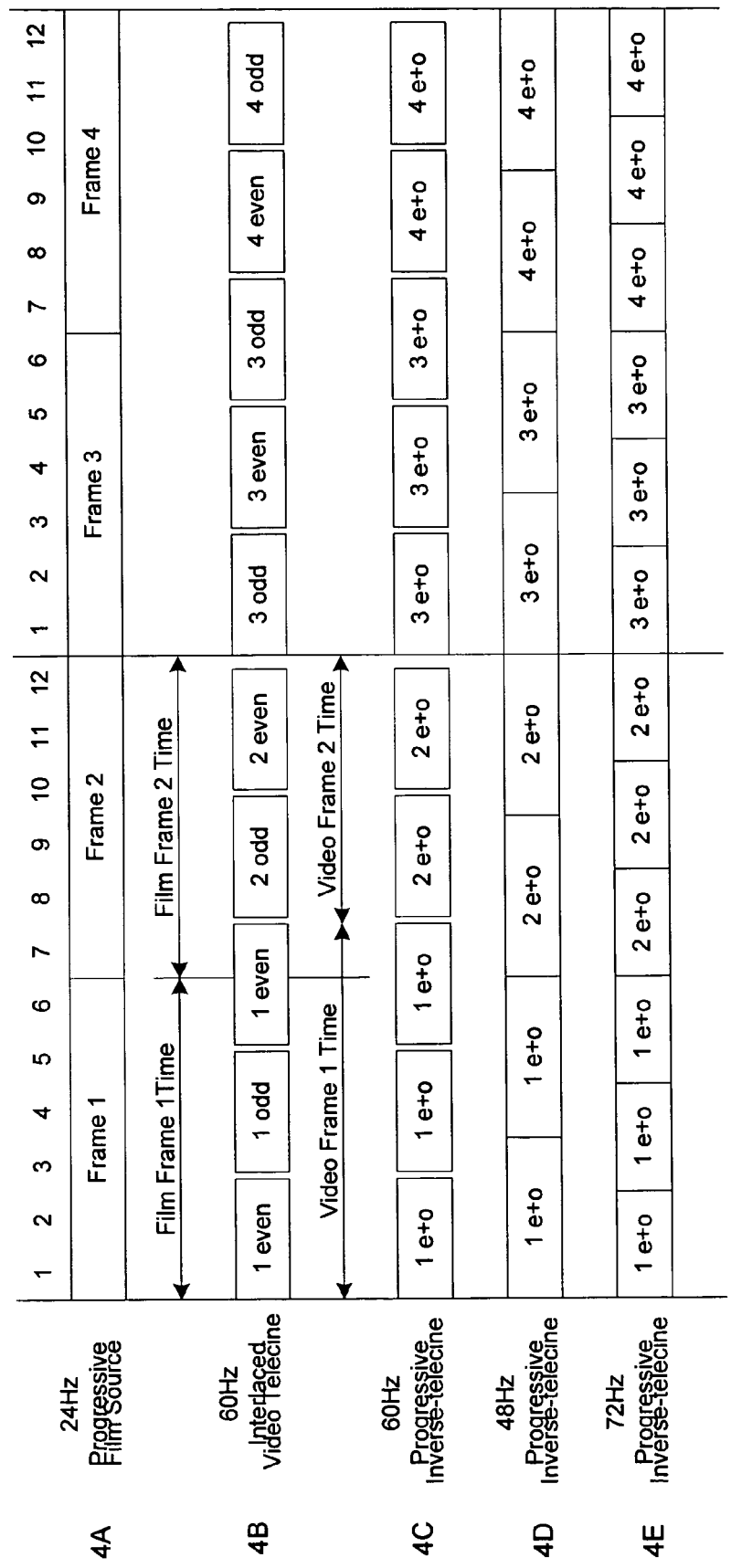
FIG. 4 is a timing diagram to illustrate an operation of an embodiment of the film mode judder elimination circuit and method.

FIG. 4 is a timing diagram to illustrate an operation of an embodiment of the film mode judder elimination circuit and method. Line 4A shows a 24 Hz progressive film source where each frame has a film time frame of $\frac{1}{24}^{th}$ of a second. Line 4B shows a 60 Hz interlaced signal after the progressive film source is converted using telecine or 3:2 pulldown. The video frame time is either $\frac{3}{60}$ths (3 frames) or $\frac{2}{60}$ths (2 frames) of a second. Line 4C shows a 60 Hz progressive scan signal after the 60 Hz interlaced signal (4B) is converted using reverse telecine or reverse 3:2 pulldown. Judder is the different between the film time frame (always $\frac{1}{24}^{th}$ of a second) and the video frame time (either $\frac{3}{60}^{th}$ or $\frac{2}{60}^{th}$ of a second). Note the judder remains after the reverse telecine converts the 60 Hz interlaced signal (4B) to the 60 Hz progressive scan signal (4C).

An embodiment of the judder elimination circuit and method locks the field rate to a multiple of the film's field rate when it detects the progressive scan signal originated from film (film mode detection). In line 4D, the judder elimination circuit locks the field rate to twice the film's field rate or 48 Hz. In line 4E, the judder elimination circuit locks the field rate to thrice the film's field rate or 72 Hz. Doing so eliminates the time errors introduced in the telecine conversion of the 24 Hz film source to the 60 Hz interlaced signal. The result is a smoother display of the progressive scan signal on the panel 160 (FIG. 1) when the signal or content originated from film.

I have illustrated and described the principles of a film mode judder elimination circuit and method by way of illustrative and not restrictive examples. Those of skill in the art will recognize certain modifications, permutations, additions, and sub-combinations to the exemplary embodiments I describe above. I intend that the following claims and those claims I introduce later be interpreted to include all such modifications, permutations, additions, sub-combinations as are within the spirit and scope.

I claim:

1. An apparatus comprising:
   a film mode detector to detect a film mode in a video signal and generate a film mode signal responsive to the detection, the film mode signal indicating whether the video signal originated from film; and
   a judder eliminator to eliminate judder by dynamically transitioning from a first field rate to a second field rate responsive to the film mode signal,
   where the judder eliminator is adapted to dynamically transition from the first field rate to the second field rate during a vertical blanking period.

2. The apparatus of claim 1 where the judder eliminator is adapted to convert an interlaced signal having the first field rate to a progressive scan signal having the second field rate responsive to the film mode signal.

3. The apparatus of claim 1 where the judder eliminator is adapted to lock to a multiple of the first field rate responsive to the film mode signal.

4. The apparatus of claim 1 where the judder eliminator is adapted to detect a first number of vertical synchronization signals and output a second number of vertical synchronization signals, where the first number differs from the second number.

5. The apparatus of claim 1
   where the first field rate is 60 Hz; and
   where the second field rate is one of 48 Hz and 72 Hz.

6. The apparatus of claim 1 where the judder eliminator includes:
   a first register to store a horizontal period for a first mode associated with the first field rate; and
   a second register to store a horizontal period for a second mode associated with the second field rate.

7. An apparatus, comprising:
   detection means for detecting film mode in a video signal and generating a film mode signal responsive to the detection, the film mode signal indicating whether the video signal originated from film; and
   judder elimination means for eliminating judder by dynamically transitioning from a first field rate to a second field rate responsive to the film mode signal,
   where the judder elimination means includes means for dynamically transitioning from the first field rate to the second field rate during a vertical blanking period.

8. The apparatus of claim 7
   where the video signal is an interlaced signal; and
   where the judder elimination means includes conversion means for converting the interlaced signal having the first field rate to a progressive scan signal having the second field rate responsive to the film mode signal.

9. The apparatus of claim 7 where the judder elimination means includes frame locking means for locking to a multiple of the first field rate responsive to the film mode signal.

10. The apparatus of claim 7 where the judder elimination means includes vertical synchronization detection means for detecting a first number of vertical synchronization signals in the video signal and for outputting a second number of vertical synchronization signals, where the first number differs from the second number of vertical synchronization signals.

11. The apparatus of claim 7
    where the first field rate is 60 Hz; and
    where the second field rate is one of 48 Hz and 72 Hz.

12. The apparatus of claim 7 where judder elimination means includes:
    a first register means for indicating a first mode associated with the first field rate; and a second register means for indicating a second mode associated with the second field rate.

13. A method, comprising:
   detecting a video signal originated from film;
   generating a film mode signal responsive to the detecting, the film mode signal indicating whether the video signal originated from film; and
   setting a field rate responsive to the film mode signal, where setting the field rate includes transitioning between a first field rate and a second field rate during a vertical blanking period of the video signal.

14. The method of claim 13 where the detecting includes determining a film mode in the video signal.

15. The method of claim 13 where setting the field rate includes dynamically setting the field rate to a multiple of a field rate of the film.

16. The method of claim 15 where setting the field rate includes setting the field rate to twice a field rate of the film.

17. The method of claim 15 where setting the field rate includes setting the field rate to thrice a field rate of the film.

18. The method of claim 13 further comprising:
   detecting that the video signal has a 60 Hz field rate; and
   dynamically locking the field rate to 60 Hz responsive to the detecting.

19. The method of claim 13 further comprising:
   detecting that the video signal has a 60 Hz field rate; and
   dynamically locking the field rate to 48 Hz responsive to the detecting.

20. The method of claim 13 further comprising:
   detecting that the video signal has a 60 Hz field rate; and
   dynamically locking the field rate to 72 Hz responsive to the detecting.

* * * * *